United States Patent [19]
Santos et al.

[11] Patent Number: 5,500,781
[45] Date of Patent: Mar. 19, 1996

[54] DIGITAL CIRCUIT INTERRUPTER WITH MULTIPLE ACCESSORY FUNCTION

[75] Inventors: Esteban Santos, Windsor; John A. Pollman, Seymour; Paul H. Singer, West Hartford, all of Conn.

[73] Assignee: General Electric Company, New York, N.Y.

[21] Appl. No.: 239,822

[22] Filed: May 9, 1994

[51] Int. Cl.⁶ ........................................................ H02H 3/00
[52] U.S. Cl. .............................. 361/96; 361/97; 361/114
[58] Field of Search ................................ 361/96, 97, 114

[56] References Cited

U.S. PATENT DOCUMENTS

| | | | |
|---|---|---|---|
| 4,428,022 | 1/1984 | Engel et al. | 361/96 |
| 4,672,501 | 6/1987 | Bilac et al. | 361/96 |
| 4,694,373 | 9/1987 | Demeyer | 361/96 |
| 4,752,853 | 6/1988 | Matsko et al. | 361/94 |
| 4,833,563 | 5/1989 | Russell | 361/92 |
| 4,870,531 | 9/1989 | Danek | 361/93 |
| 5,220,479 | 6/1993 | Fraisse . | |
| 5,252,937 | 10/1993 | Bernier et al. | 361/837 |

OTHER PUBLICATIONS

U.S. Ser. No. 08/075,429 filed Jun. 14, 1993 to DellaVecchia et al.
U.S. Ser. No. 08/218,287 filed Mar. 28, 1994 to Castonguay et al.

*Primary Examiner*—Todd Deboer
*Attorney, Agent, or Firm*—Richard A. Menelly

[57] ABSTRACT

An integrated circuit breaker having several accessory functions along with automatic overcurrent protection, allows selection between the various accessory functions in different combinations. Separate switches are arranged on the circuit breaker to allow factory as well as field selection of the accessory function combinations.

10 Claims, 2 Drawing Sheets

DIGITAL CIRCUIT INTERRUPTER WITH MULTIPLE ACCESSORY FUNCTION

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

U.S. Pat. No. 4,833,563 entitled "Molded Case Circuit Breaker Actuator-Accessory Module" describes an integrated protection unit that includes basic overcurrent protection facility along with selective electrical accessories. A specific actuator-accessory module is selected to give the required accessory function along with basic overcurrent protection.

It would be advantageous to be able to select any combination of accessory functions along with the basic overcurrent protection by means of simple externally-accessible switches to allow user selection in the field.

Accordingly, one object of the invention is to provide simple externally-accessible switches to allow a user to customize an electronic circuit breaker to allow selectable accessory functions as well as to allow the functions to be changed on a continuing basis to meet the user's requirements.

SUMMARY OF THE INVENTION

An integrated circuit breaker having several accessory functions along with automatic overcurrent protection, allows selection between the various accessory functions in different combinations. Selection switches arranged on the circuit breaker interact with the trip unit output control circuit to allow the accessory functions to be selected initially and to be changed in accordance with user requirements.

DESCRIPTION OF THE PREFERRED EMBODIMENT

Figure 1:
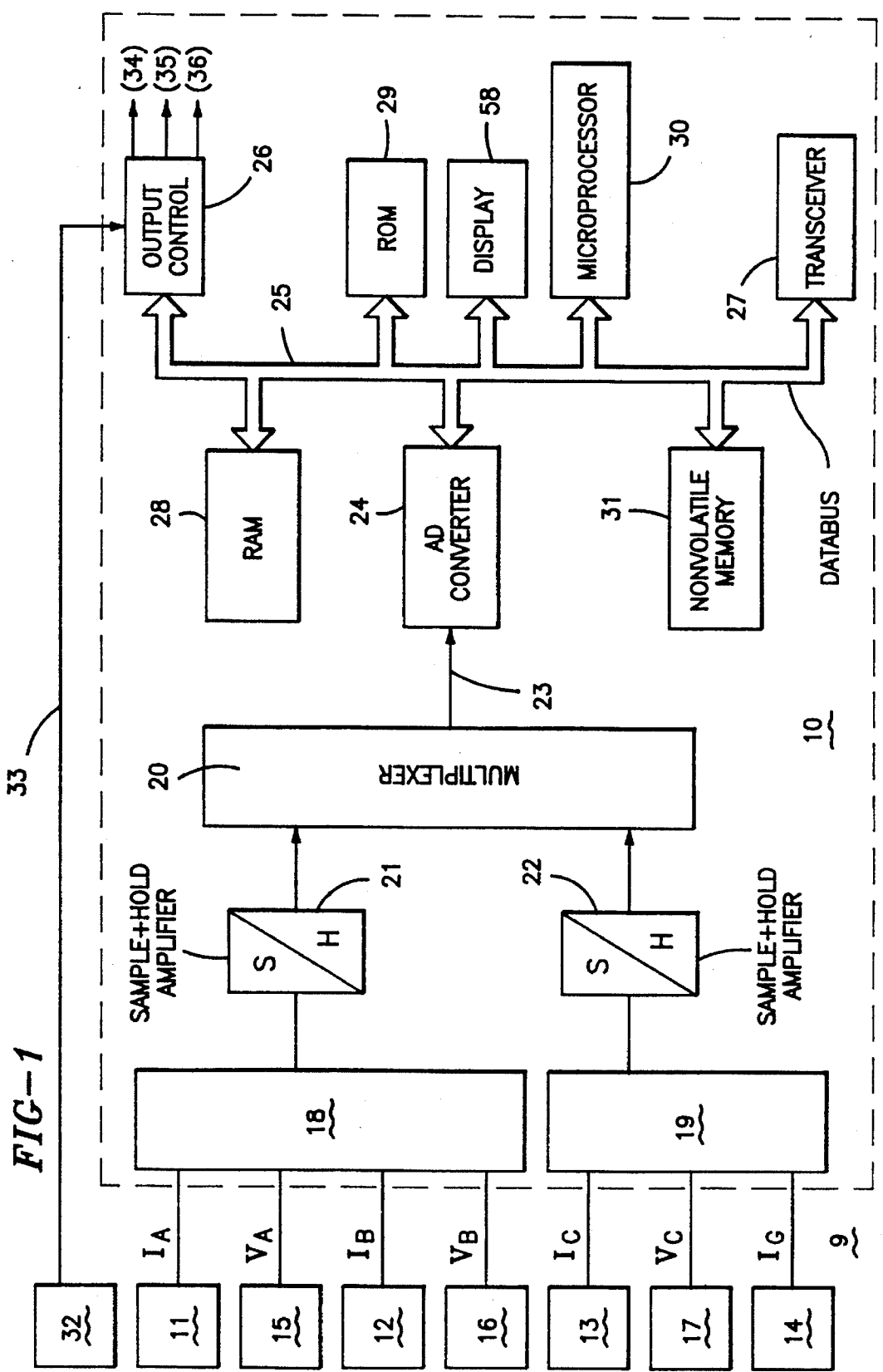
FIG. 1 is a schematic representation of a digital circuit interrupter that includes the selection switches and output control circuit according to the invention.

As described within the aforementioned U.S. Pat. No. 4,672,501 a circuit breaker controller 9 such as depicted in FIG. 1 is contained on a printed circuit card 10 to which external connection is made with current transformers 11–14 and potential transformers 15–17. The electrical input is transmitted through multiplexers 18–20 and sample and hold amplifiers 21,22 to an A/D converter 24 by means of conductor 23. As described within the aforementioned U.S. Patent, circuit protection and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 58 that is similar to that described in U.S. Pat. No. 4,870,531 entitled "Circuit Breaker removable Display and Keyboard". Operating power to the printed circuit card 10 is supplied by the current transformers 11–14 from the associated electrical distribution system.

Figure 2:
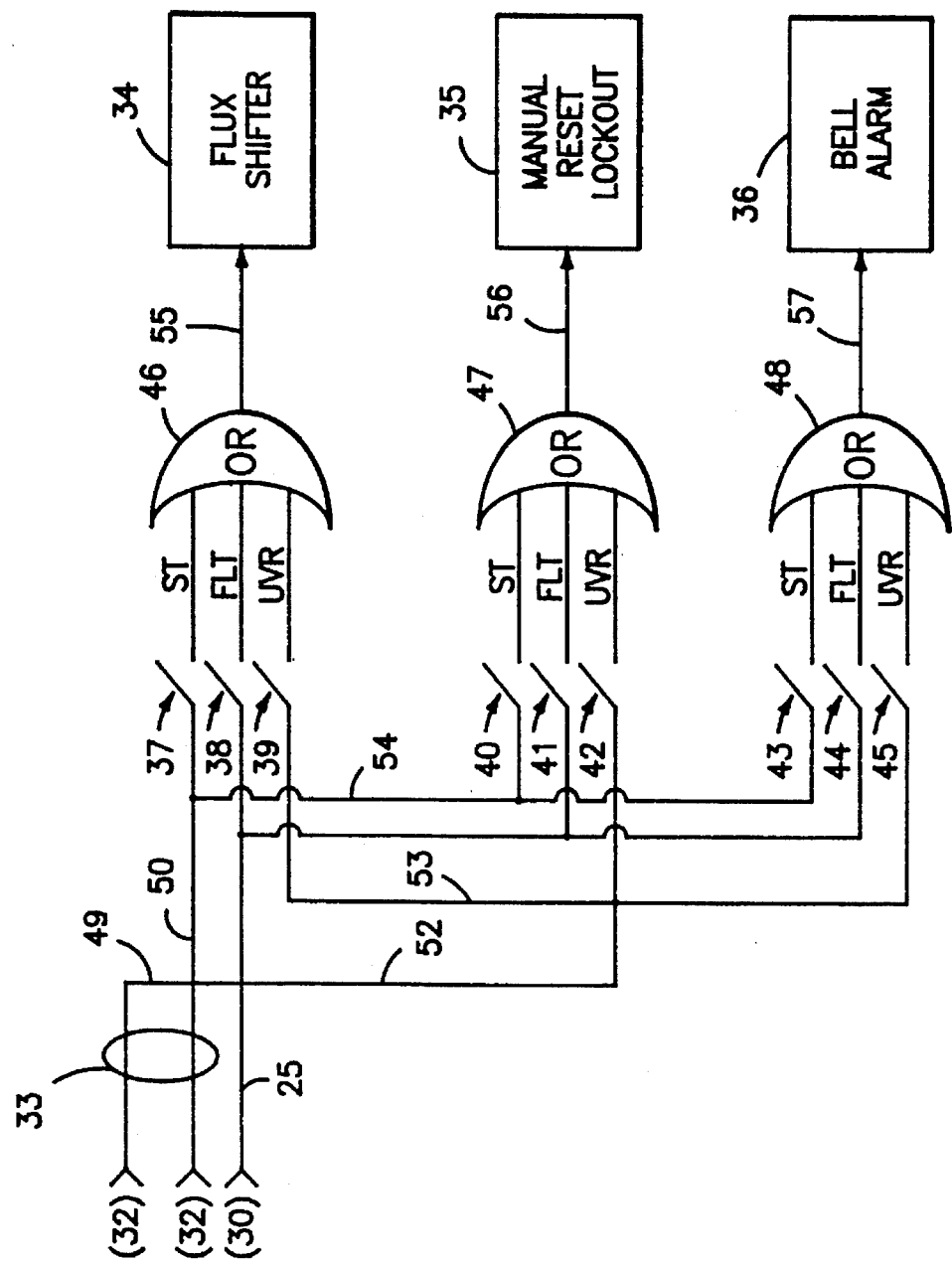
FIG. 2 is a detailed circuit diagram of the output control circuit within the circuit interrupter of FIG. 1.

As best seen by now referring to both FIGS. 1 and 2, accessory functions such as the flux shifter 34, manual reset lockout 35 and the bell alarm 36 can be activated in differing combinations by means of the function actuator unit 32 that connects with the output control circuit 26 over a multiconductor cable 33. The switches 37–45 which connect with the shunt trip "ST", fault trip "FLT" and undervoltage release "UVR" inputs to the OR gates 46–48 are externally-accessible dip switches such the 7100 series supplied by AMP Inc. Harrisburg, Pa. Operating signals are sent over conductors 49, 52 to the UVR inputs to the OR gates and are sent over conductors 50, 54 to the ST inputs. As described in the aforementioned U.S. Pat. No. 4,672,501, the trip signals to the flux shifter 34 are controlled by the microprocessor 30 with connects with the OR gates by means of the data bus 25 and conductor 52. A flux shifter unit having capability for shunt trip, fault trip and undervoltage release operation is described in the aforementioned U.S. Pat. No. 4,833,563. The operation of a bell alarm to indicate the status of the circuit breaker contacts is found in U.S. Pat. No. 5,252,937 entitled "Molded Case Circuit Breaker Modular Bell Alarm Unit" and the operation of means to prevent resetting of the circuit breaker operating mechanism after a trip function is found in U.S. Pat. No. application Ser. No. 08/218,287 entitled "A Latching Arrangement for High Ampere Rated Circuit Breaker Operating Mechanism". The output of OR gate 46 connects with the flux shifter 34 over conductor 55, the output of OR gate 47 connects with the manual reset lockout 35 over conductor 56 and the output of OR gate 48 connects with the bell alarm 36 over conductor 57, as indicated.

The operator by selecting the various OPEN and CLOSED conditions of switches 37–45 in a ladder logic array can provide any combination of initial accessory functions and can change the combination in accordance with later requirements.

In place of the dip switches described above, a relay having remote contact settings, such as disclosed in U.S. patent application Ser. No. 08/075,429 entitled "Modular Industrial Control Relay" can be employed to select the combination of accessory functions.

An integrated circuit breaker having a plurality of accessory functions has been herein described. A plurality of switch positions connecting with the accessory units through parallel connection with corresponding OR gates allows custom selection of the accessory functions.

We claim:

1. An electronic circuit interrupter comprising:

transformer means arranged for connection with an electrical distribution system;

a processor circuit connecting with said transformer means receiving sample current signals to determine the occurrence of an overcurrent condition;

an output circuit connecting with said processor circuit to interrupt current transfer through an electrical distribution circuit;

a plurality of electrical accessories interconnected with said output circuit, said accessories being arranged for selective operation in response to external operating signals applied to said output circuit: and a first plurality of switches connecting with a first electronic gate for operating a first of said accessories.

2. The electronic trip unit of claim 1 including a second plurality of switches connecting with a said accessories and said second electronic gate for operating a second of said accessories.

3. The electronic trip unit of claim 1 including a third plurality of switches connecting with a third electronic gate for operating a third of said accessories.

4. The electronic trip unit of claim 1 wherein said processor circuit includes a microprocessor.

5. The electronic trip unit of claim 1 wherein said transformer means comprises a plurality of current transformers.

6. The electronic trip unit of claim 1 wherein said switches comprise digi-switches.

7. The electronic trip unit of claim 1 wherein said switches comprise electronic relays.

8. The electronic trip unit of claim 1 wherein said first electronic gate comprises an OR gate.

9. The electronic trip unit of claim 1 wherein said tripping means comprises a flux shifter unit.

10. The electronic trip unit of claim 1 wherein said accessories are selected from the group consisting of shunt trip, undervoltage release, manual reset lockout and bell alarm.

* * * * *